Figure 1:
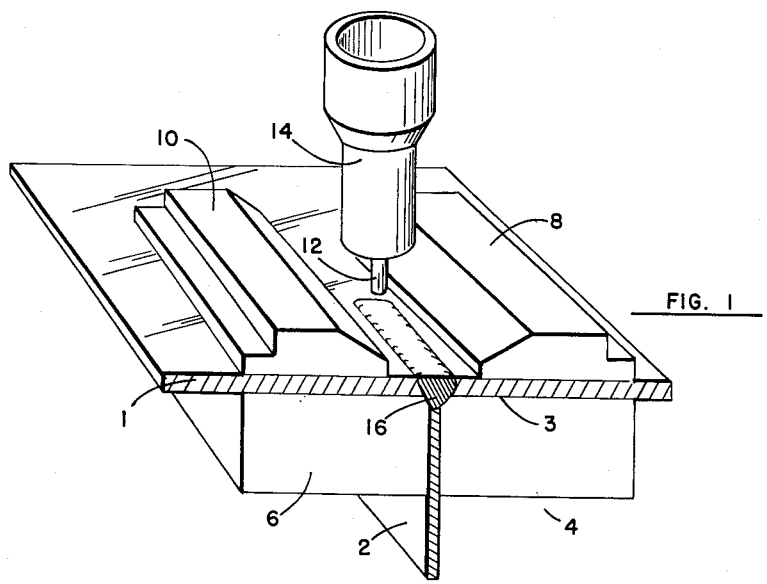

Dec. 5, 1961   J. R. HARRISON   3,012,130
METHOD OF JOINDER
Filed April 18, 1960

INVENTOR.
JAMES R. HARRISON
BY
ATTORNEY

United States Patent Office 3,012,130
Patented Dec. 5, 1961

3,012,130
METHOD OF JOINDER
James R. Harrison, Whittier, Calif., assignor to North American Aviation, Inc.
Filed Apr. 18, 1960, Ser. No. 23,062
7 Claims. (Cl. 219—137)

This invention concerns a method for joining together two or more members by fusion therebetween, each member having relatively greater length and breadth than thickness, wherein the members do not have a substantial portion of their surfaces in contact, but instead have the edge of one member joined to the surface of another. More particularly, the invention contemplates an improved method of forming strong welded joints between relatively thin members of the stated type arranged, for example, in simulated T relationship without distortion or unevenness of either member resulting from the welding process.

The invention disclosed herein is applicable to the fabrication of any structure which requires welding members of the type stated and in the relationship described above. However, a particular need for this invention arose in connection with the fabrication of advanced high speed type aerial vehicles, wherein the techniques and materials formerly employed for conventional supersonic aircraft and missiles are often unsatisfactory. Structure used in vehicles of the stated type must be capable of withstanding the extreme temperatures and stresses encountered during operation of the vehicle. As a specific example, thin sheet metal skin surfaces such as formerly used in aircraft construction are totally inadequate, and reinforced skin surfaces of honeycomb sandwich panel type are necessary. Rivets for securing reinforced type skin surfaces are largely impractical, since rivets are both too short and too weak to secure effectively structural elements of such thickness. In addition, in the manufacture of vehicles of the stated type, materials of construction formerly in wide use have been discarded in favor of new materials of increased hardness and strength, with consequent decrease in machinability, necessitating specialized fabrication techniques. It has been found expedient to fabricate each portion of airfoil and panel structure from large sections which are separately fabricated and then securely joined together. Welding is the most acceptable method of joinder between such sections, based upon a comparison of factors such as cost, overall strength, economy of weight, and production feasibility for welding as against various alternative fastening means.

In addition to the need for increased structural strength at high temperature in the fabrication of vehicles within the stated class, efficient use of available space and weight is of greater importance than with conventional high performance aircraft, since the penalties of size, weight and drag are greatly multiplied during space travel at extremely high speed. In designing the strongest possible structure with the least possible weight, notably regarding means by which skin surfaces of the type described may be secured to adjacent structure, the limitations of known welding techniques are of particular concern. The use of advanced metal alloys such as precipitation hardenable steel in fabricating vehicles of the stated class complicates the welding problem in that tremendous heat is necessary to effect fusion of such metals. Since the stated skin surfaces are fabricated from extremely thin gage sheet metal, and internal bracing members are similarly thin due to severe limitations upon the weight of such components, welding of brace members to skin sections by known techniques is totally unfeasible.

In considering the limitations of all known welding techniques, it is basic that the thermal characteristics of metals greatly influence their weldability. All welding processes have two dominant characteristics in common, namely; the weld or fusion area is localized, and the weld is done in a relatively short time, usually in a progressive manner. Thus, only a small portion in a relatively large mass of cold metal is heated to the molten state and immediately cooled. In fusion welding, the temperature often is raised much higher than the melting point of the base metal, and some of this heat permeates the base metal surrounding the weld area. Thermal changes such as expansion and contraction are an essential consideration in evaluating a particular welding problem, as well as changes in physical characteristics such as strength and ductility. Moreover, metallurgical affects such as crystallization and heat treatment occur due to the application of welding heat.

These several effects are particularly emphasized in the case of joining a light section to a relatively heavy section, or joining two light metallic members to each other. This emphasis is partly due to the high rate of thermal conductivity in thin metallic sections, causing welding heat to be generally spread over a wider area, producing greater and more uneven expansion; also, such members undergo a more severe reduction in strength than do larger, heavier members during heating, and require support to prevent buckling. Greater heat is naturally required to transform a larger mass of metal to the molten state, as necessary for fusion welding, than the amount of heat sufficient to fuse a small mass. When two masses of metal are fused together, the relative amounts of heat induced into each member usually are directly proportional to the thickness of each member. The amount of heat induced into each member in comparison with the other is referred to as the heat balance. In the prior art, the mass of metal involved in a welding problem has always been a critical limiting factor, since the mass should be sufficient to safely absorb the welding heat within the time required to effect fusion of the material. Also, fusing one member having small mass to another having relatively larger mass is more difficult than joining two members having masses in a 1 to 1 proportion, since in the latter case an ideal heat balance between the welded members is more closely approachable. The greatest ratio of thickness between two members joined, for example, in simulated T relationship in the prior art has been 4 to 1 maximum. Anything beyond this ratio is not commercially practical or expedient, because the amount of heat necessary to fuse the heavier member causes distortion of the lighter member, and no favorable heat balance can be achieved by methods known to the prior art. In contrast to the above limitations, the method based upon the inventive concept disclosed herein has been used with great success to weld two members in T relationship with a ¼ inch thick horizontal top member and a .015 inch thick vertical lower member. In the stated example, the ratio of masses is far in excess of 4 to 1, namely over 16 to 1.

In addition to the above, the problem of welding thin or light sections is further complicated by the acute residual stresses resulting from the welding operation. Residual stress results from the rapid and uneven cooling of molten metal in the area of the weld, and from phase transformation of the granular structure in base metal beyond the area of the weld. Residual stresses usually have a highly deleterious effect upon the strength of the welded article, since loads externally applied to the article must be limited so that the combined stresses of both external and residual type will not exceed the yield or rupture value of the metal.

In welding thin sections by use of techniques heretofore known, the stress and distortion effects described above are both unavoidable and acute. Strong, clean and accurate welded joints have been heretofore unobtainable in welding metallic sections lacking sufficient mass to safely absorb and dissipate the welding heat within the time required to effect fusion of the material. Therefore, known welding techniques are unaccepable, since accurate fitting of welded components in fabricating vehicles of the stated class is essential, especially where large sections must be joined together along continuous high-strength weld seams, and avoidance of the slightest distortion and resulting misalignment is commensurately important.

In addition, bracing members have in the past commonly been fabricated from relatively long lengths of channel stock, which are obtained by extruding materials through a die having the desired cross-sectional shape of the finished stock. However, some of the advanced type alloys referred to above cannot be extruded, and other means are required to obtain channel sections from such material. Since the component parts of typical light gage channel section are relatively thin, involve edgewise joinder of one portion to another such as T or L-shaped cross-section channels, and since any distortion at all would render the finished article useless, it was generally thought that channel sections from such material could only be machined at great trouble and expense, and that welding was totally unfeasible.

Accordingly, it is a general object of the invention disclosed herein to provide a strong, accurate and distortion-free weld between the edge of a thin sheet metal element and the surface of another such element.

It is a further object of the instant invention to provide a method of welding thin gage metal sections generally arranged to simulate a T or L-shaped cross-section.

It is a further object of the instant invention to provide a method of fabricating welded channel members from material not readily extrudable.

Figure 2:
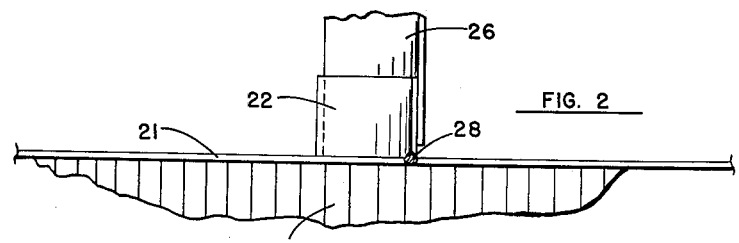
Figure 3:
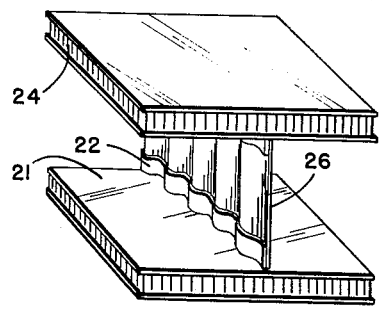
Figure 4:
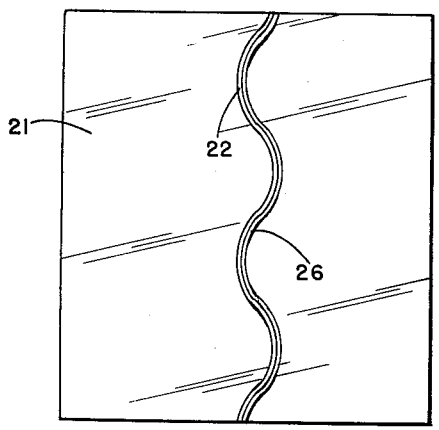

Other objects and advantages will become apparent upon a close reading of the following detailed description of an illustrative embodiment of the inventive concept, reference being had to the accompanying drawings wherein:

FIGURE 1 shows a general view of two thin metal sections being joined to each other by welding in accordance with the method disclosed herein, FIGURE 2 shows a detailed view of a weldment between a wing spar and skin assembly accomplished in accordance with the method disclosed herein, FIGURE 3 shows a general perspective view of a portion of structure fabricated in accordance with the detailed showing of FIGURE 2, and FIGURE 4 shows a plan view of the structure shown in FIGURE 2.

In essence, the invention disclosed herein concerns joinder of two members where an edge of the first member abuts a surface of the second member. It is basic to the teachings of this invention that welding heat is not applied directly to both members which are sought to be joined. Instead the members are placed in contacting relationship and heat applied directly to only one member is conducted through such member to the other. Thus, the abutting edge of a member in contact with the surface of another member is fused by heat which originates at the welding heat, then is conducted through the contacted member to reach the contacted surface, from whence it heats the abutting edge. The method herein disclosed is of wide general application, and the teachings set forth below are pertinent to joinder of a surface to an edge or an end of any material capable of being fused by the application of heat, regardless of the angle of abutment, the specific composition, or the precise thickness of the material. However, the invention is of particular importance in connection with joinder of relatively thin sheet metal pieces or parts. Therefore, for the sake of explanation, the method will be described in connection with the joinder of two plane sections of thin sheet metal to form a simulated T, such as shown by FIGURE 1. Thus, a first member 1 is held substantially horizontal and a second member 2 is placed with its upper edge in contact with the surface 3 of first member 1. Chill bars 4, 6, 8 and 10 of substantial mass are placed in contact with members 1 and 2 so that heat absorbed by the stated two members will in turn be absorbed by the chill bars. Welding apparatus which may take the form of one of several known types is situated above the first member 1 as shown. In FIGURE 1, the welding means comprises a tungsten electrode 12 secured within a ceramic cup 14 which may be connected to conventional welding apparatus so that an inert gas flows downwardly through cup 14 and around electrode 12 while an arc is established between the electrode and the upper surface of cap member 1. Heat is thus applied by electrode 12 in an inert environment, and causes the metal in cap member 1 and the abutting edge of member 2 to transform to a molten state in the area indicated by reference numeral 16 in FIGURE 1. Electrode 12 is moved along a path of travel vertically aligned with the area of abutting contact between first member 1 and second member 2, causing a continuous weld puddle to form as shown at 16 throughout the lengths of the stated area of contact. The heat applied by welding means 12 and the speed of travel of the electrode may be adjusted as necessary to produce optimum results in the finished weld.

It will be understood by those skilled in the welding art that the type of welding apparatus employed in place of welding means 12 may be varied according to the precise material and dimensions of the members 1 and 2. Also, the addition of metal to weld puddle 16 by external means in the form of a welding or a filler rod, or by the use of a consumable electrode, may be accomplished according to the desired condition of the finished weld. Alternatively, the elements to be joined may be merely fused together without the addition of material from a welding rod, as shown in FIGURE 1, for example. It will be further understood that, whereas in the specific example shown by FIGURE 1 both members 1 and 2 are planar in form, one or both of the members 1 or 2 could be curved or angular without departing from the basic teachings of the instant case. Thus, for example, in the structure shown by FIGURES 2, 3 and 4, mounting brackets 22 are of sinusoidal wave form as seen from the top view of FIGURE 4. Brackets 22 may be welded to skin surface 21 in a manner similar to that described for joinder of members 1 and 2 shown in FIGURE 1. Thus, before honeycomb material 24 is brazed to surface 21, bracket 22 may be positioned with one edge in contact with surface 21 in the manner of second member 2 with respect to first member 1 as shown by FIGURE 1. Chill bars (not shown) corresponding to bars 4, 6, 8 and 10 of FIGURE 1 except for their shape may be provided on each side of the weld joints, and a weld effected at 28 in the manner described in connection with FIGURE 1. Spar 26 may later be secured to bracket 22 to complete the assembly as shown in FIGURE 3.

The method disclosed herein is very successful in producing strong, distortion-free joints between members of the type described above, such as thin metallic sections formed as shown by FIGURE 1, for example. Steel alloys in sheet form as thin as .006 inch have been joined using the inventive technique without perceptible distortion of either the vertical or horizontal members of the finished T cross-sectional piece.

The details set forth above may be varied without departing from the scope of the inventive concept as disclosed herein and defined by the appended claims.

I claim:

1. A method of joining a first thin metallic member and a second thin metallic member by fusion therebetween, each said member having substantially uniform thickness and relatively greater length and breadth than thickness, and an edge of said first member being joined to a surface of said second member, said method comprising: placing said edge of said first member in contact with said surface of said second member, and applying heat to the opposite surface of said second member so that heat is conducted through the thickness of said second member and induced into said edge of said first member, causing the material in said first and second members to unite along the area of contact therebetween.

2. The method set forth in claim 1, in addition to which a plurality of chill bars are situated in contact with the said two members before heat is applied, and subsequently removed after the application of heat.

3. A method of joining together two relatively thin members of substantially uniform thickness by placing the first said member with an edge thereof in contact with a surface of the second said member, and applying heat to the opposite surface of said second member so that heat is transmitted through said second member and induced into said first member along said contacting edge, causing the material in said two members to unite.

4. The method set forth in claim 3, in addition to which the said edge is situated on the said surface so that the surfaces of said first member adjacent the joint are substantially perpendicular to the surfaces of said second member adjacent the joint.

5. A method for welding an edge of a first relatively thin metal sheet of substantially uniform thickness to a surface of a second metal sheet of greater thickness than said first sheet, comprising: placing said edge in contact with said surface, and applying heat to said second metal sheet so that heat penetrates through said second metal sheet and into said first metal sheet and welds said edge to said surface.

6. A method of fusing together a first relatively thin member and a second relatively thin member, said first member having a thickness less than 25 percent of the thickness of said second member, said first member being joined to said second member in a generally perpendicular relationship, said method comprising: placing said first member in contacting relationship on one side of said second member, and applying heat to the opposite side of said second member, fusing said two members together in the area of contact.

7. The method set forth in claim 6, in addition to which means are provided to cool and support the said two members during the application of heat.

References Cited in the file of this patent

UNITED STATES PATENTS 2,849,592     Hawthorne _____ Aug. 26, 1958

FOREIGN PATENTS 571,618     Great Britain _____ Aug. 31, 1945